(12) United States Patent
Thapliya et al.

(10) Patent No.: US 9,819,598 B2
(45) Date of Patent: Nov. 14, 2017

(54) INFORMATION PROCESSING SYSTEM, INFORMATION PROCESSING APPARATUS, AND NON-TRANSITORY COMPUTER READABLE MEDIUM

(71) Applicant: FUJI XEROX CO., LTD., Tokyo (JP)

(72) Inventors: Roshan Thapliya, Yokohama (JP); Haiyang Ma, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 105 days.

(21) Appl. No.: 14/879,802

(22) Filed: Oct. 9, 2015

(65) Prior Publication Data
US 2016/0036711 A1    Feb. 4, 2016

Related U.S. Application Data

(63) Continuation of application No. PCT/JP2014/056813, filed on Mar. 14, 2014.

(30) Foreign Application Priority Data

Aug. 6, 2013 (JP) ................. 2013-163641

(51) Int. Cl.
H04L 1/00 (2006.01)
H04L 12/825 (2013.01)
H04L 12/26 (2006.01)

(52) U.S. Cl.
CPC .......... H04L 47/25 (2013.01); H04L 43/0888 (2013.01); H04L 43/16 (2013.01)

(58) Field of Classification Search
CPC ....... H04B 7/00; H04L 12/64; H04L 12/6418; H04L 12/66; H04L 12/5689; H04L 45/00;
(Continued)

(56) References Cited

U.S. PATENT DOCUMENTS 6,999,430 B2 * 2/2006 Holtzman ............. H04L 1/1819
370/230
7,522,631 B1 * 4/2009 Brown ................ H04L 12/6418
370/352
(Continued)

FOREIGN PATENT DOCUMENTS

JP    2004254025 A    9/2004
JP    2008035510 A    2/2008

OTHER PUBLICATIONS

Jun. 3, 2014 International Search Report issued in International Application No. PCT/JP2014/056813.
(Continued)

*Primary Examiner* — Dady Chery
(74) *Attorney, Agent, or Firm* — Oliff PLC

(57) ABSTRACT

An information terminal 10B receives plural UDP packets each having a predetermined data size and sequentially transmitted at a predetermined time interval in a predetermined order; extracts pairs of the UDP packets, in which each of a transmission order and a reception order is continuous and the transmission order and the reception order match with each other, from among the received UDP packets; calculates an evaluation value for evaluation of a delay state of a communication path between an information terminal 10A and the information terminal 10B based on comparison between a reception time interval of the packets in each of the extracted pairs of the UDP packets and the predetermined time interval; and judges whether a bit rate of the UDP packets is available or unavailable based on comparison between the calculated evaluation value and a threshold.

8 Claims, 7 Drawing Sheets

(58) Field of Classification Search
CPC ......... H04L 45/10; H04L 45/22; H04L 49/25; H04L 49/256; H04W 40/26; H04W 2215/42; H04J 14/0267; H04J 2203/0023; H04J 2203/0053; H04M 2215/42
USPC ....... 370/310, 433, 435, 466, 352, 465, 468, 370/493, 494, 495
See application file for complete search history.

(56) References Cited

U.S. PATENT DOCUMENTS

| | | | |
|---|---|---|---|
| 8,190,745 B2 | 5/2012 | Xiao et al. | |
| 2005/0185604 A1* | 8/2005 | Agarwal | H04L 1/1614 370/299 |
| 2010/0020681 A1 | 1/2010 | Nakashima et al. | |
| 2010/0111004 A1* | 5/2010 | Yi | H04L 12/5695 370/329 |
| 2013/0114598 A1* | 5/2013 | Schrum | H04L 45/24 370/392 |

OTHER PUBLICATIONS

Jun. 3, 2014 Written Opinion issued in International Patent Application No. PCT/JP2014/056813.

* cited by examiner

| RECORD ID | PACKET SEQUENCE NUMBER | TRANSMISSION TIME | RECEPTION TIME | PACKET SIZE | TRANSMISSION INTERVAL | PROCESSED FLAG |
|---|---|---|---|---|---|---|
| R0001 | 1 | 7.1.2013 10:00:00 | 7.1.2013 10:00:03 | 500 K | 5(S) | T |
| R0002 | 3 | 7.1.2013 10:00:10 | 7.1.2013 10:00:15 | 500 K | 5(S) | T |
| R0003 | 4 | 7.1.2013 10:00:15 | 7.1.2013 10:00:17 | 500 K | 5(S) | T |
| R0004 | 5 | 7.1.2013 10:00:20 | 7.1.2013 10:00:26 | 500 K | 5(S) | T |
| ⋮ | ⋮ | ⋮ | ⋮ | ⋮ | ⋮ | ⋮ |
| R1001 | 1 | 7.1.2013 10:01:00 | 7.1.2013 10:00:10 | 1000 K | 5(S) | F |

| BIT RATE | DIR | AVAILABLE/ UNAVAILABLE FLAG |
|---|---|---|
| 100 kbps | 0.01 | T |
| 150 kbps | 0.06 | F |

INFORMATION PROCESSING SYSTEM, INFORMATION PROCESSING APPARATUS, AND NON-TRANSITORY COMPUTER READABLE MEDIUM

CROSS REFERENCE TO RELATED APPLICATION

This is a continuation of International Application No. PCT/JP2014/056813 filed on Mar. 14, 2014, and claims priority from Japanese Patent Application No. 2013-163641, filed on Aug. 6, 2013.

BACKGROUND

Technical Field

The present invention relates to an information processing system, an information processing apparatus, and a non-transitory computer readable medium.

SUMMARY

An aspect of the present invention provides an information processing system including a first apparatus and a second apparatus. The first apparatus includes a transmitting unit that sequentially transmits a plurality of UDP packets each having a predetermined data size to the second apparatus at a predetermined time interval in a predetermined order. The second apparatus includes a receiving unit that receives the UDP packets sequentially transmitted by the transmitting unit; an extracting unit that extracts pairs of the UDP packets, in which each of a transmission order and a reception order is continuous and the transmission order and the reception order match with each other, from among the UDP packets received by the receiving unit; a calculating unit that calculates an evaluation value for evaluation of a delay state of a communication path between the first apparatus and the second apparatus based on comparison between a reception time interval of the packets in each of the pairs of the UDP packets extracted by the extracting unit and the predetermined time interval; and a judging unit that judges whether a bandwidth of a bit rate, which is calculated in accordance with the predetermined data size and the predetermined time interval, is available or unavailable for communication between the first apparatus and the second apparatus based on comparison between the evaluation value calculated by the calculating unit and a threshold.

BRIEF DESCRIPTION OF THE DRAWINGS

Exemplary embodiment(s) of the present invention will be described in detail based on the following figures, wherein.

DETAILED DESCRIPTION

An exemplary embodiment for implementing the invention (hereinafter, referred to as exemplary embodiment) is described below with reference to the drawings.

1. Description of System Configuration

Figure 1:
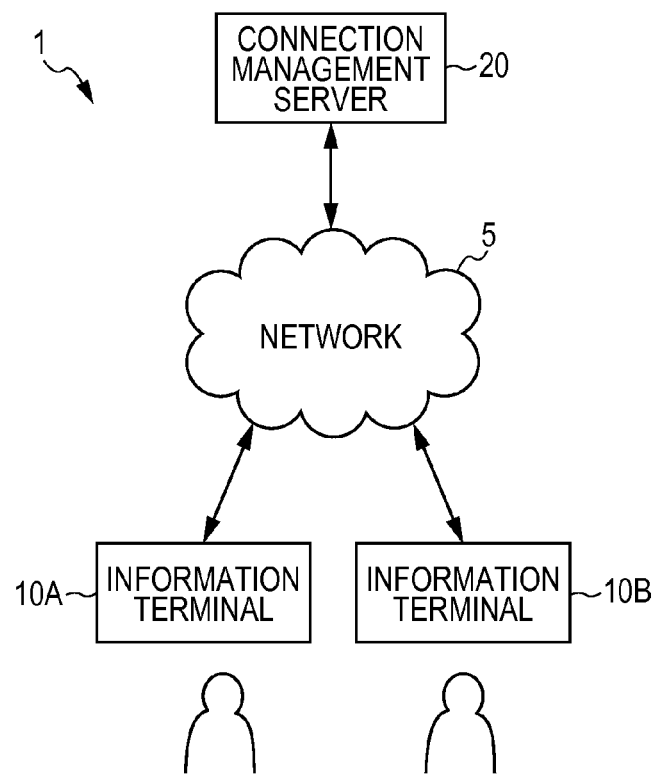
FIG. 1 is a system configuration diagram of an information processing system according to this exemplary embodiment.

FIG. 1 shows a system configuration diagram of an information processing system 1 according to this exemplary embodiment. As shown in FIG. 1, the information processing system 1 includes plural information terminals 10A and 10B, and a connection management server 20. The plural information terminals 10A and 10B, and the connection management server 20 are connected with a network 5 and hence can mutually make communication. In this exemplary embodiment, the only two information terminals 10A and 10B are illustrated to simplify the description; however, three or more information terminals 10 may be included. A Matter common to the information terminals 10A and 10B is described while the information terminals 10A and 10B are expressed as information terminal 10.

In this exemplary embodiment, processing of executing a video conference between the information terminals 10A and 10B is described as an example. In this case, the information terminals 10A and 10B make access to the connection management server 20, and make direct communication through a communication path established by the connection management server 20. Before the information terminals 10A and 10B make communication with data of the video conference, the information terminals 10A and 10B measure information of the bandwidth of the communication path used for the data communication of the video conference, set the quality of image and voice of the video conference based on the measured information of the bandwidth, and start the communication of the video conference after the setting.

2. Description of Hardware Configuration

An example of a hardware configuration included in the information terminal 10 to provide the above-described processing is described below.

Figure 2:
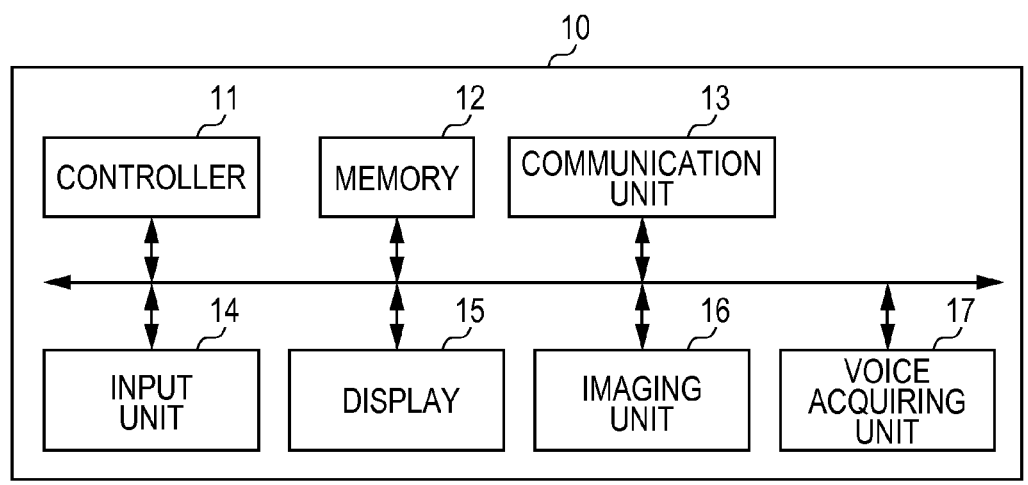
FIG. 2 is a hardware configuration diagram of an information terminal.

FIG. 2 shows a hardware configuration of the information terminal 10. As shown in FIG. 2, the information terminal 10 includes a controller 11, a memory 12, a communication unit 13, an input unit 14, a display 15, an imaging unit 16, and a voice acquiring unit 17.

The controller 11 includes a CPU (Central Processing Unit). The controller 11 executes various types of arithmetic processing and controls respective units of the information terminal 10 based on a program stored in the memory 12.

The memory 12 stores a control program and data for an operating system and so forth of the information terminal 10, and is also used for a work memory of the controller 11. The program may be previously written in the memory 12, may be supplied to the information terminal 10 in a stored state in an information storage medium, such as an optical disc, a magnetic disk, a magnetic tape, a magneto-optical disk, or a flash memory, or may be supplied to the information terminal 10 through a data communication network such as the Internet.

The communication unit 13 includes, for example, a wireless or wired communication interface. The communication unit 13 is connected with a network through the communication interface, and makes communication with the other information terminal 10 or the connection management server 20 connected with the network.

The input unit 14 is provided by an input device, such as a touch panel or a keyboard. The input unit 14 receives an operation input from a user.

The display 15 is provided by a display device such as a liquid crystal display. The display 15 displays a result (screen) of information processing by the controller 11.

The imaging unit 16 is provided by a built-in or externally connected camera. The imaging unit 16 may acquire a movie by capturing an image every predetermined period (for example 1/60 seconds), in addition to a still image.

The voice acquiring unit 17 is provided by a built-in or externally connected microphone. The voice acquiring unit 17 may acquire voice data by the microphone.

3. Description of Sequence

Next, the details of processing executed by the information processing system 1 are described with reference to sequence diagrams and flowcharts shown in FIGS. 3 to 7.

3-1. Communication-path Establishment Processing

Figure 3:
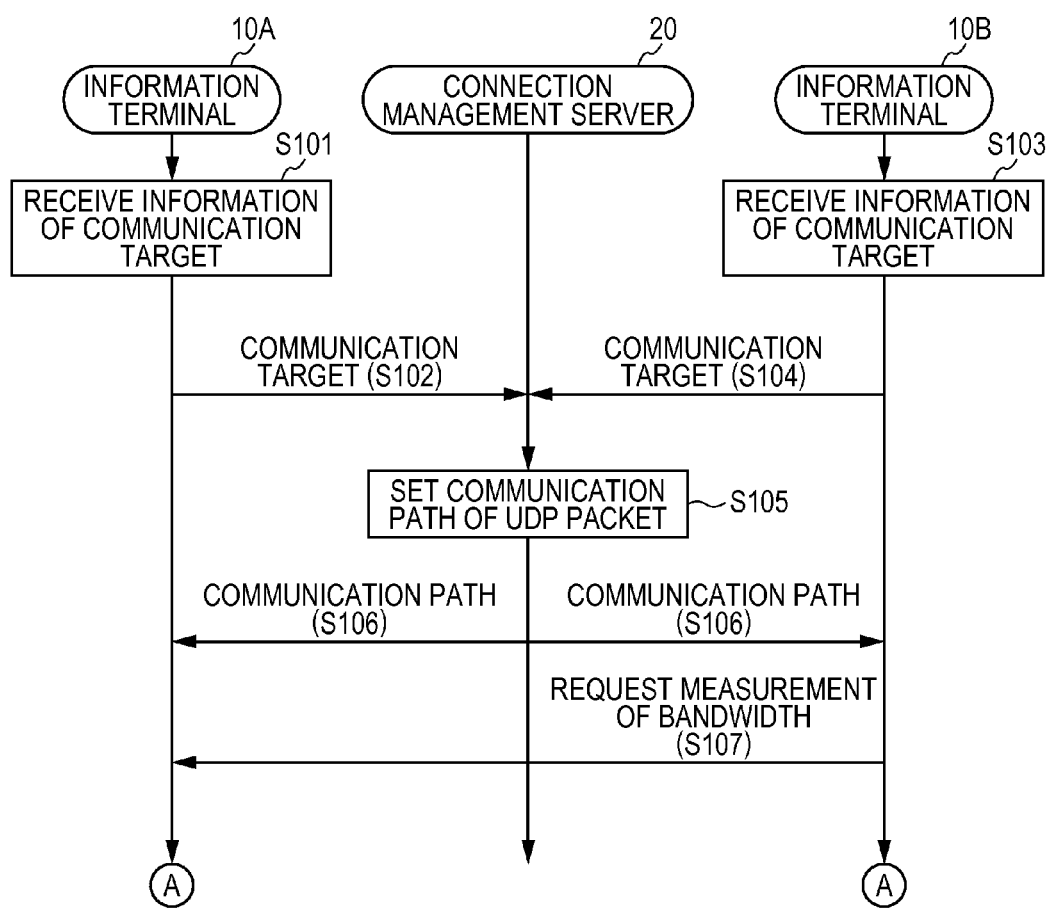
FIG. 3 is a sequence diagram of communication-path establishment processing.

FIG. 3 shows a sequence diagram of processing for establishing a communication path between the information terminals 10A and 10B (communication-path establishment processing).

As shown in FIG. 3, when the information terminal 10A receives information of a communication target (in this case, assumed as information terminal 10B) from a user (S101), the information terminal 10A makes access to the connection management server 20, and transmits the received information of the communication target (the information terminal 10B) to the connection management server 20 (S102).

When the information terminal 10B receives information of a communication target (in this case, assumed as information terminal 10A) from a user (S103), the information terminal 10B makes access to the connection management server 20, and transmits the received information of the communication target (the information terminal 10A) to the connection management server 20 (S104).

If the information of the devices whose access has been received (the information terminals 10A and 10B) meets the information of the communication targets (the information terminals 10A and 10B), the connection management server 20 sets a communication path through which both the devices make direct communication with a UDP packet between the devices whose access has been received (S105), and notifies the information terminals 10A and 10B about the set communication path (S106).

When the communication path is set by the connection management server 20, in the example of this sequence, the information terminal 10B (or the information terminal 10A) requests the information terminal 10A (or the information terminal 10B) for measurement of the bandwidth through the set communication path (S107). Alternatively, the side that receives information among plural information terminals 10 that make communication may request the side that distributes information for the measurement of the bandwidth. Still alternatively, in a case in which plural information terminals 10 mutually distribute data, if the bandwidth of the communication path for reception is asymmetric to the bandwidth for transmission, the plural information terminals 10 may each make a request for the measurement of the bandwidth. Bandwidth measurement processing that is executed in S107 and later is described with reference to a sequence in FIG. 4.

3-2. Bandwidth Measurement Processing

Next, the details of bandwidth measurement processing are described with reference to the sequence diagram shown in FIG. 4.

Figure 4:
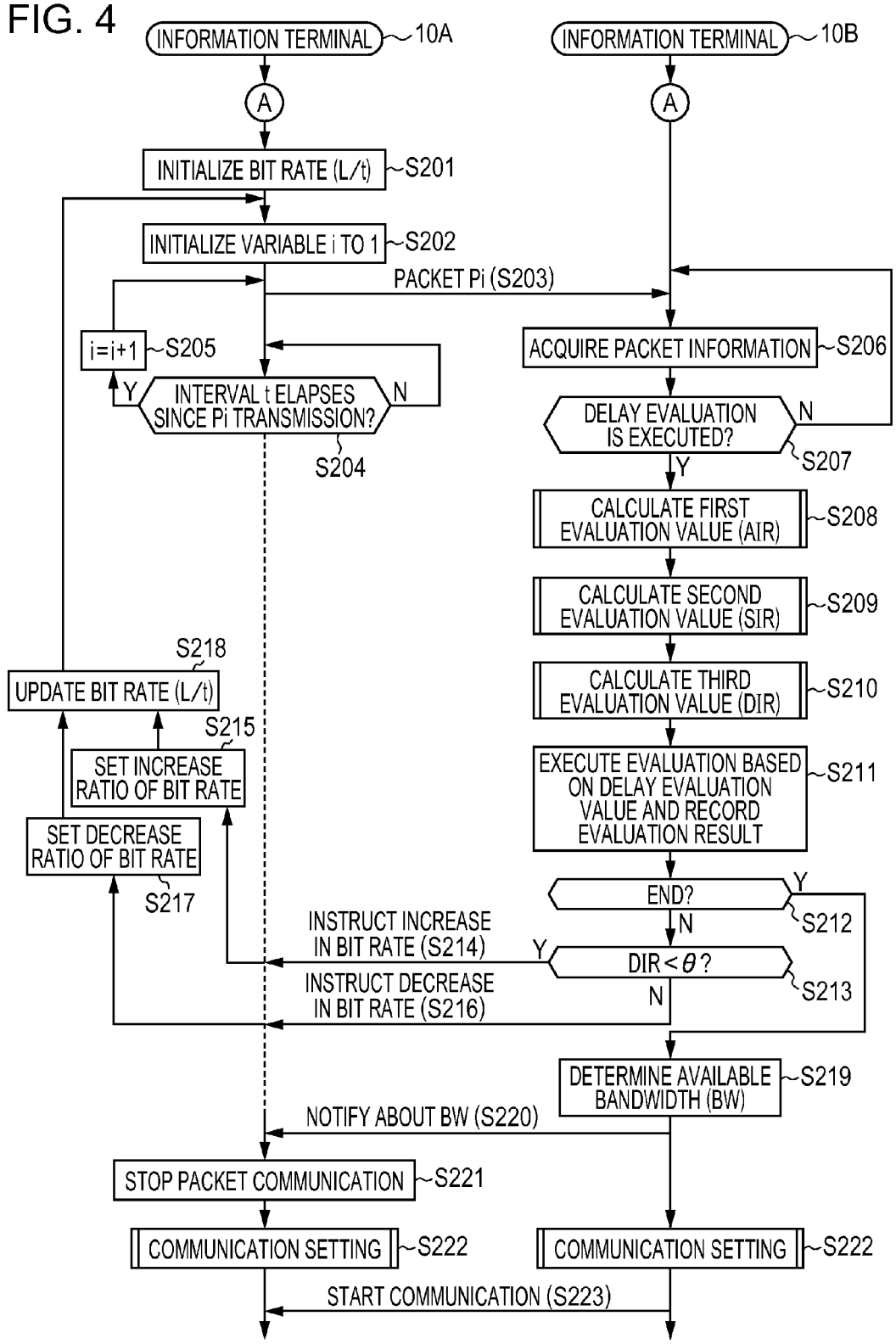
FIG. 4 is a sequence diagram of bandwidth measurement processing.

As shown in FIG. 4, the information terminal 10A initializes the bit rate of a packet to be transmitted to the information terminal 10B (setting to an initial value) (S201). For example, if it is assumed that the packet size of a UDP (User Datagram Protocol) packet to be transmitted to the information terminal 10B is L (bit) and the transmission interval of the UDP packet is t (second), the bit rate of the information terminal 10A is expressed by L/t (bps).

Then, the information terminal 10A initializes a variable i to 1 (S202), and transmits a UDP packet Pi with the packet size L to the information terminal 10B (S203). The variable i indicates the transmission order of packets to be transmitted to the information terminal 10B at the same bit rate.

Then, if the interval (elapsed time) t does not elapse since the packet Pi is transmitted (S204: N), the information terminal 10A waits. If the interval (elapsed time) t elapses since the packet Pi is transmitted (S204: Y), the variable i is incremented (that is, 1 is added to i) (S205), the processing goes back to S203, and the subsequent processing is repetitively executed.

Also, if the information terminal 10B receives the UDP packet Pi transmitted from the information terminal 10A, the information terminal 10B records information about the received UDP packet Pi (packet information) (S206). For example, the information terminal 10B may record information about the UDP packet Pi received from the information terminal 10A, in a packet-information management table shown in FIG. 8.

Figures 8, 9, 10:
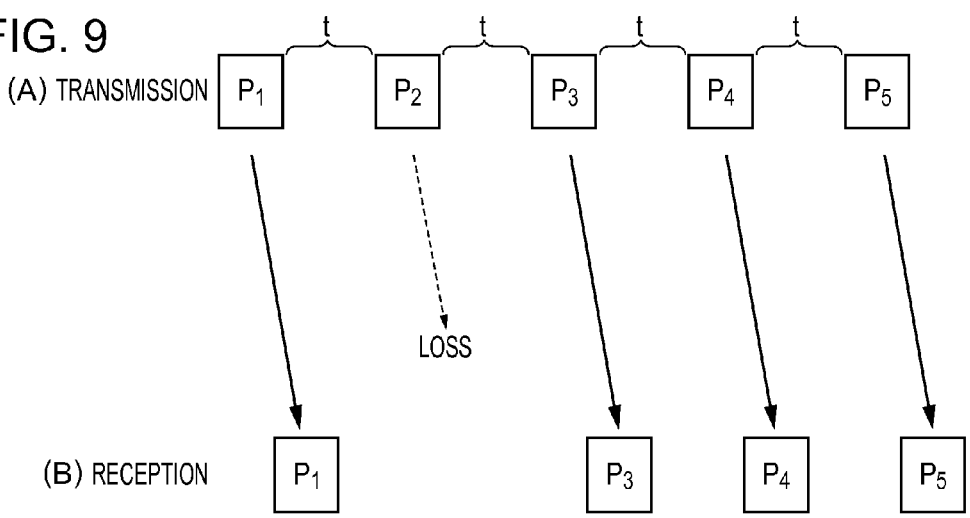
FIG. 8 is an illustration showing an example of a packet-information management table.
FIG. 9 is an explanatory illustration showing continuous packet pairs.
FIG. 10 is an illustration showing an example of a bit-rate management table.

As shown in FIG. 8, the packet-information management table may have recorded therein a record ID, a sequence number of a received UDP packet (transmission order information), a transmission time of the received UDP packet, a reception time of the received UDP packet, a packet size of the received UDP packet, transmission-interval information, and a processed flag (T: processed, F: non-processed) in an associated manner. The information about the sequence number, transmission time, packet size, and transmission interval of the DUP packet may be included in, for example, payload information of the UDP packet.

Then, if the information terminal 10B determines not to execute delay evaluation based on the received UDP packet (S207: N), the information terminal 10B waits. If the information terminal 10B determines to execute the delay evaluation based on the received UDP packet (S207: Y), the information terminal 10B executes processing in S208 and later. Alternatively, for example, the information terminal 10B may determine to execute the delay evaluation if UDP packets transmitted at the same bit rate are received by a certain number or more. Still alternatively, the information terminal 10B may determine to execute the delay evaluation if a certain time elapses since first reception of a UDP packet transmitted at a new bit rate.

The information terminal 10B calculates a first evaluation value (AIR: Average Received Delay Increase Ratio) for evaluation of a delay state based on the information of the UDP packet received from the information terminal 10A (S208). The first evaluation value is a value (ratio) indicating how received UDP packets delays in average with respect to the transmission interval t of the UDP packets. The details of first-evaluation-value calculation processing are described below with reference to a flowchart in FIG. 5.

3-3. First-evaluation-value Calculation Processing

Figure 5:
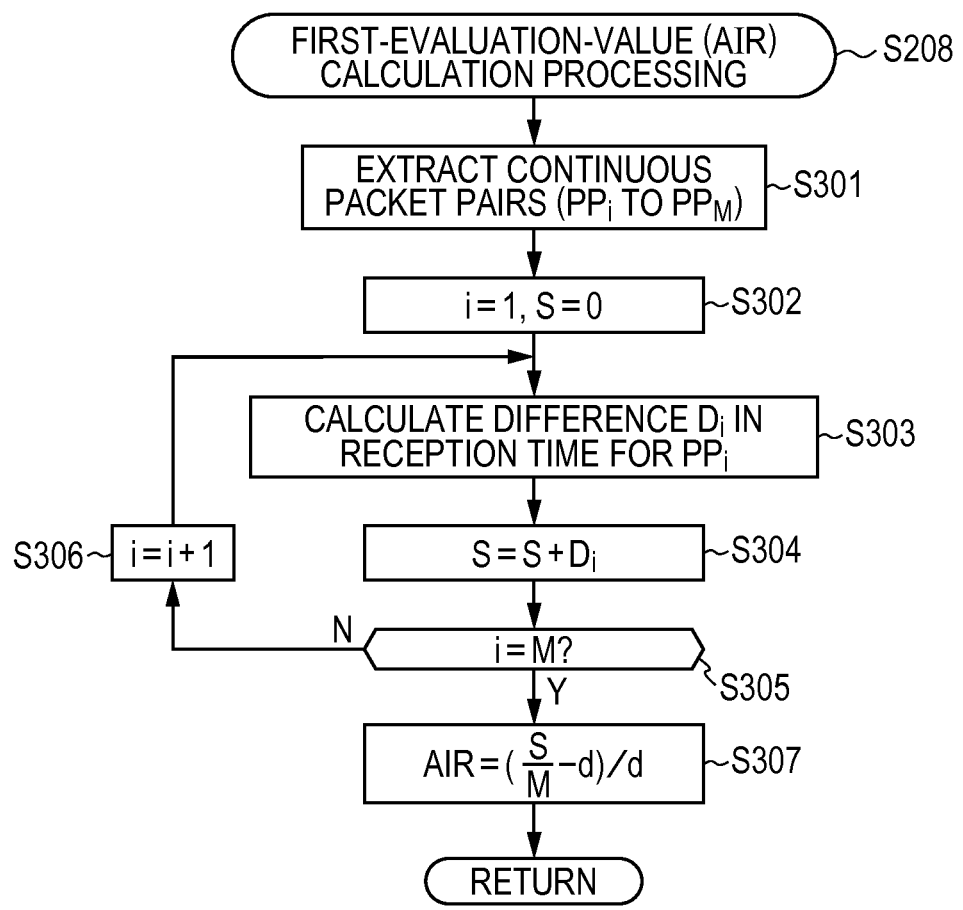
FIG. 5 is a flowchart of first-evaluation-value calculation processing.

As shown in FIG. 5, the information terminal 10B extracts pairs of UDP packets (continuous packet pairs), the transmission order of which is continuous and the reception order of which is also continuous, from among the UDP packets received from the information terminal 10A (S301). Herein, M is an integer of 1 or larger, and the continuous packet pairs extracted in S301 are expressed as $PP_1$ to $PP_M$.

FIG. 9 shows an illustration explaining continuous packet pairs. Part (A) of FIG. 9 shows transmission packets transmitted at the interval t from the information terminal 10A to the information terminal 10B, and indicates that the transmission packets are transmitted in the order of $P_1$, $P_2$, $P_3$, $P_4$, and $P_5$. Part (B) of FIG. 9 shows reception packets received by the information terminal 10B from the information terminal 10A, and indicates that the packets are received in the order of $P_1$, $P_3$, $P_4$, $P_5$ (it is to be noted that $P_2$ is not received because of loss). In this case, packets to be extracted as continuous packet pairs are two pairs of $(P_3, P_4)$ and $(P_4, P_5)$ because each of the transmission order and the reception order is both continuous and the orders match with each other.

Alternatively, the information terminal 10B may extract a pair of records with continuous sequence numbers from among records with processed flags being F (non-processed) in the packet management table shown in FIG. 8, and hence may extract a continuous packet pair based on the extracted pair of records.

Then, the information terminal 10B initializes the variable i to 1 and a variable S to 0 (S302), and calculates a difference $D_i$ in the reception time for the continuous packet pair $PP_i$ extracted in S301 (S303). For example, the information terminal 10B may calculate $D_i$ by subtracting the reception time of the former reception packet from the reception time of the later reception packet in the continuous packet pair $PP_i$.

The information terminal 10B adds $D_i$ calculated for the continuous packet pair $PP_i$ to S (S304). If the variable i does not reach M (the number of continuous packet pairs) (S305: N), the information terminal 10B increments the variable i (adds 1) (S306), goes back to S303, and repeats processing in S303 and later. If the variable i reaches M (the number of continuous packet pairs) (S305: Y), the information terminal 10B calculates the first evaluation value AIR by Expression (1) (S307), and returns.

$$AIR=(S/M-d)/d \qquad \text{Expression (1)}$$

The description goes back to the sequence diagram in FIG. 4, and is continued. When the information terminal 10B completes the calculation of the first evaluation value (AIR) (S208), the information terminal 10B calculates a second evaluation value (SIR: Separate Increase Ratio) for evaluation of a delay state, based on the information of the UDP packet received from the information terminal 10A (S209). The second evaluation value is a value indicating a ratio of the number of pairs, the reception delay time of which is longer than the transmission interval t of the packets, from among the continuous packet pairs received from the information terminal 10A. The details of second-evaluation-value calculation processing are described below with reference to a flowchart in FIG. 6.

3-4. Second-evaluation-value Calculation Processing

Figure 6:
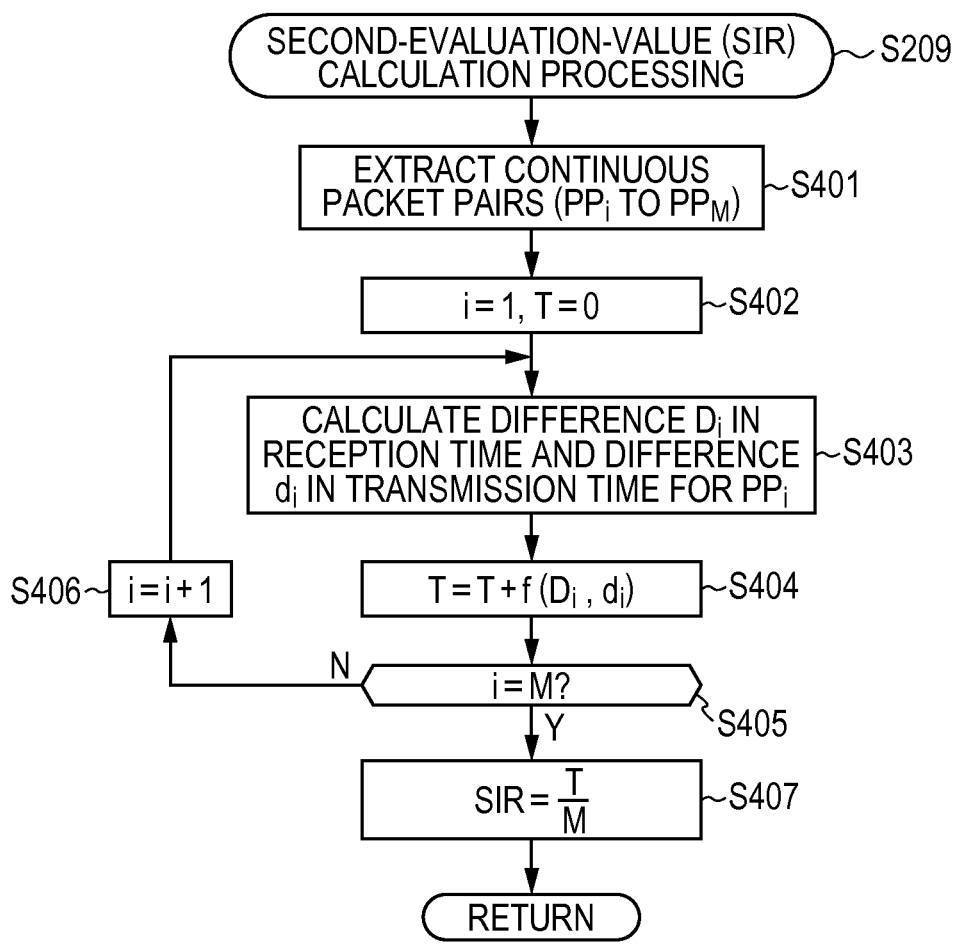
FIG. 6 is a flowchart of second-evaluation-value calculation processing.

As shown in FIG. 6, the information terminal 10B extracts pairs of UDP packets (continuous packet pairs), the transmission order of which is continuous and the reception order of which is also continuous, from among the UDP packets received from the information terminal 10A (S401). Herein, M is an integer of 1 or larger, and the continuous packet pairs extracted in S401 are expressed as $PP_1$ to $PP_M$.

Then, the information terminal 10B initializes the variable i to 1 and a variable T to 0 (S402), and calculates a difference $D_i$ in the reception time for the continuous packet pair $PP_i$ and a difference $d_i$ in the transmission time for the continuous packet pair $PP_i$ extracted in S401 (S403). For example, the information terminal 10B may calculate $D_i$ by subtracting the reception time of the reception packet with the former sequence number from the reception time of the reception packet with the latter sequence number in the continuous packet pair $PP_i$, and may calculate $d_i$ by subtracting the transmission time of the reception packet with the former sequence number from the transmission time of the reception packet with the latter sequence number in the continuous packet pair $PP_i$.

The information terminal 10B adds a value of a function $f(D_i, d_i)$ to the variable T (S404). In this case, the function f is a function that returns 1 if $D_i > d_i$, and returns 0 if $D_i \leq d_i$.

If the variable i does not reach M (the number of continuous packet pairs) (S405: N), the information terminal 10B increments the variable i (adds 1) (S406), goes back to S403, and repeats processing in S403 and later. If the variable i reaches M (the number of continuous packet pairs) (S405: Y), the information terminal 10B calculates the second evaluation value SIR by Expression (2) (S407), and returns.

$$SIR=T/M \qquad \text{Expression (2)}$$

The description goes back to the sequence diagram in FIG. 4, and is continued. When the information terminal 10B completes the calculation of the second evaluation value (SIR) (S209), the information terminal 10B calculates a delay evaluation value (DIR: Delay Increase Ratio) based on the first evaluation value (AIR) calculated in S208 and the second evaluation value (SIR) calculated in S209 (S210).

For example, the information terminal 10B may calculate the delay evaluation value (DIR) by Expression (3) based on the calculated AIR and DIR while assuming that $0 < \gamma < 1$.

$$DIR=\gamma \cdot AIR+(1-\gamma) \cdot SIR \qquad \text{Expression (3)}$$

Then, the information terminal 10B executes evaluation based on the delay evaluation value (DIR) calculated in S210, and records the evaluation result (S211). For example, if DIR is smaller than a threshold θ (for example, 0.05 (5%)) (DIR<θ), the information terminal 10B judges that the bit rate (L/t) of the subject packet with DIR calculated is available. If DIR is equal to or larger than the threshold θ (for example, 0.05 (5%)) (DIR≥θ), the information terminal 10B judges that the bit rate (L/t) of the subject packet with DIR calculated is unavailable. Then, the information terminal 10B may record the above-described judgment result in, for example, a bit-rate management table shown in FIG. 10. In this case, the processed flag of the packet management table for the packet relating to the bit rate being the processing subject may be updated to processed (T) after the bit-rate management table is updated.

FIG. 10 shows an example of the bit-rate management table. As shown in FIG. 10, in the bit-rate management table, information of the bit rate relating to the subject packet with DIR calculated, information of the calculated DIR, and information of the flag indicating whether the bit rate is available or unavailable (T: available, F: unavailable) are recorded in an associated manner.

Then, the information terminal 10B judges whether an end condition for the band-width measurement processing is satisfied or not based on the evaluation result regarding DIR (S212). For example, if the difference between a maximum value R1 of the bit rate judged as being available and a minimum value R2 of the bit rate judged as being unavailable becomes equal to or smaller than a threshold C in the bit-rate management table, that is, if R2−R1≤C is established, the information terminal 10B may judge that the end condition is satisfied. Otherwise, the information terminal 10B may judge that the end condition is not satisfied. If availability/unavailability of the bit rate that is $\alpha$ ($\alpha$>1) times the bit rate R, which has been judged as being available, is judged after the bit rate R, the relationship of R2=$\alpha$·R1 is established. In this case, it may be judged that the end condition is satisfied if ($\alpha$−1)R1≤C is established. Otherwise, it may be judged that the end condition is not satisfied.

If the end condition is not satisfied in S212 (S212: N) and DIR is smaller than the threshold $\theta$ (S213: Y), the information terminal 10B instructs the information terminal 10A to increase the bit rate (S214). When the information terminal 10A receives the instruction to increase the bit rate from the information terminal 10B, the information terminal 10A sets an increase ratio of the bit rate (for example, $\alpha$ ($\alpha$>1)) (S215).

If the end condition is not satisfied in S212 (S212: N) and DIR is not smaller than the threshold $\theta$ (S213: N), the information terminal 10B instructs the information terminal 10A to decrease the bit rate (S216). When the information terminal 10A receives the instruction to decrease the bit rate from the information terminal 10B, the information terminal 10A sets a decrease ratio of the bit rate (for example, 1/$\beta$ ($\beta$>1)) (S217). In this case, the values of $\alpha$ and $\beta$ may be $\alpha$=$\beta$, or the value of $\beta$ may be set every judgment to decrease the bit rate within a range that is not smaller than the maximum bit rate judged as being available (for example, if the previous judgment result indicates being unavailable, the value of $\beta$ may be set to be smaller than the previous value of $\beta$).

The information terminal 10B updates the bit rate based on the increase ratio of the bit rate set in S215 or the decrease ratio of the bit rate set in S217 (S218). For example, when the bit rate is increased to $\alpha$ times, the information terminal 10B may update the current packet size L to $\alpha$L, may update the current interval t to t/$\alpha$, or may update both the packet size and the interval to consequently increase the bit rate to $\alpha$ times. Also, for example, when the bit rate is decreased to 1/$\beta$ times, the information terminal 10B may update the current packet size L to L/$\beta$, may update the current interval t to $\beta$t, or may update both the packet size and the interval to consequently decrease the bit rate to 1/$\beta$.

After the information terminal 10B updates the bit rate of the packet to be transmitted in S218, the information terminal 10B goes back to S202 and repetitively executes the processing in S202 and later again.

Also, if the end condition is satisfied in S212 (S212: Y), the information terminal 10B determines an available bandwidth (BW) based on the maximum value R1 of the bit rate judged as being available and the minimum value R2 of the bit rate judged as being unavailable (S219). For example, the information terminal 10B may determine BW that satisfies R1≤BW<R2 based on R1 and R2, or may determine BW as the range from R1 to R2.

Then, the information terminal 10B notifies the information terminal 10A about the bandwidth (BW) determined in S219 (S220), and executes communication setting based on the bandwidth (BW) (S222).

Also, when the information terminal 10A receives the notification about the bandwidth (BW) from the information terminal 10B, the information terminal 10A stops transmission of UDP packets (S221), and executes communication setting based on the notified bandwidth (BW) (S222).

The details of communication setting processing executed by the information terminals 10A and 10B are described below with reference to a flowchart shown in FIG. 7.

3-5. Communication Setting Processing (Bit-rate Allocation Processing)

Figure 7:
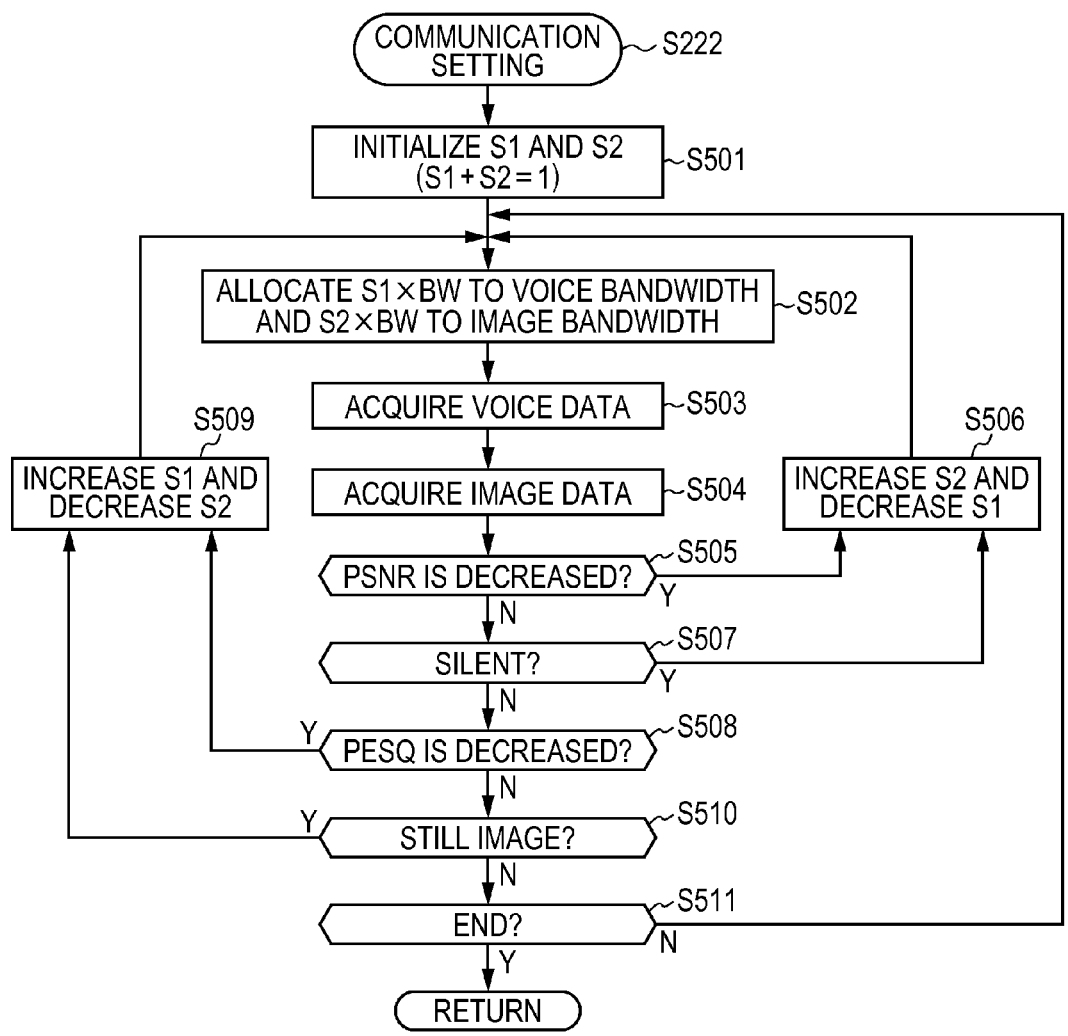
FIG. 7 is a flowchart of communication setting processing.

FIG. 7 shows a flowchart of the communication setting processing. As shown in FIG. 7, the information terminal 10 initializes a variable S1 (ratio of voice bandwidth) and a variable S2 (ratio of image bandwidth) (initial values, for example, S1=0.5, S2=0.5) (S501). It is to be noted that S1 and S2 are actual numbers in a range from 0 to 1, and satisfy S1+S2=1.

Then, the information terminal 10 allocates S1·BW to the voice bandwidth, and S2·BW to the image bandwidth (S502).

The information terminal 10 acquires voice data by the voice acquiring unit 17 (S503), and acquires image data by the imaging unit 16 (S504).

Then, the information terminal 10 acquires PSNR (Peak Signal to Noise Ratio) of a movie based on the image data (in case of movie data) acquired in S504. If PSNR is decreased (S505: Y), the information terminal 10 updates S1 and S2 to increase S2 and to decrease S1 (S506) and goes back to S502.

Also, if PSNR is not decreased in S505 (S505: N), the information terminal 10 goes to S507. In S507, if the voice data acquired in S503 is silent (S507: Y), the information terminal 10 updates S1 and S2 to increase S2 and to decrease S1 (S506) and goes back to S502.

Then, if the voice data is not silent in S507 (S507: N), the information terminal 10 acquires PESQ (Perceptual Evaluation of Speech Quality) of voice based on the voice data acquired in S504. If PESQ is decreased (S508), the information terminal 10 updates S1 and S2 to increase S1 and to decrease S2 (S509) and goes back to S502.

Also, if PESQ is not decreased in S508 (S508: N), the information terminal 10 goes to S510. In S510, if the image data acquired in S504 is a still image (S510: Y), the information terminal 10 updates S1 and S2 to increase S1 and to decrease S2 (S509) and goes back to S502.

Then, if the image data is not a still image in S510 (S510: N) and when the setting processing is not ended (S511: N), the information terminal 10 goes back to S502 and repeats the processing, or when the setting processing is ended (S511: Y), the information terminals 10 returns.

The description goes back to the sequence diagram in FIG. 4, and is continued. When the information terminals 10A and 10B complete the communication setting processing (S222), the information terminals 10A and 10B start communication processing (for example, video conference) (S223).

With the above-described information processing system 1, before plural apparatuses start transmission/reception of multimedia data, setting can be made such that multimedia data is transmitted/received with a quality corresponding to a communication bandwidth among the plural apparatuses. Accordingly, degradation in user experience from the start of communication does not occur.

4. Modification

Also, the invention is not limited to the above-described exemplary embodiment. For example, in the above-described exemplary embodiment, the example in which the video conference is executed between the information terminals 10 has been described. However, the invention may be applied to a case in which an information terminal 10 receives streaming distribution of multimedia data from an information distribution server. In this case, similarly to the information terminal 10A shown in FIG. 4, the information distribution server may transmit a UDP packet to an information terminal 10 being a streaming distribution target before a streaming session is started, the information terminal 10 being the streaming distribution target may measure the bandwidth based on the UDP packet, and the information terminal 10 may set the quality of multimedia data being the streaming subject based on the measured bandwidth.

Also, in the above-described exemplary embodiment, after the information terminals 10A and 10B start transmission/reception of multimedia data, the quality of the multimedia data to be transmitted/received may be actively updated based on the delay time of the multimedia data to be transmitted/received, a change in delay time, a packet loss rate, etc.

Also, in the above-described exemplary embodiment, the example in which the invention is applied to one-to-one communication has been described. However, the invention may be applied to M-to-N communication (M being an integer of 1 or larger, N being an integer of 1 or larger). In this case, the bandwidth is measured for each communication path, and the communication quality corresponding to the measured bandwidth may be set for each communication path.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing system comprising:
a first apparatus and a second apparatus,
wherein the first apparatus includes at least one processor configured to act as:
a transmitting unit that sequentially transmits a plurality of UDP packets each having a predetermined data size to the second apparatus at a predetermined time interval in a predetermined order, and
wherein the second apparatus includes at least one processor configured to act as:
a receiving unit that receives the UDP packets sequentially transmitted by the transmitting unit,
an extracting unit that extracts pairs of the UDP packets, in which each of a transmission order and a reception order is continuous and the transmission order and the reception order match with each other, from among the UDP packets received by the receiving unit,
a calculating unit that calculates an evaluation value for evaluation of a delay state of a communication path between the first apparatus and the second apparatus based on comparison between a reception time interval of the packets in each of the pairs of the UDP packets extracted by the extracting unit and the predetermined time interval, and
a judging unit that judges whether a bandwidth of a bit rate, which is calculated in accordance with the predetermined data size and the predetermined time interval based on comparison between the evaluation value calculated by the calculating unit and a threshold, is available or unavailable for communication between the first apparatus and the second apparatus.

2. The information processing system according to claim 1,
wherein the at least one processor acting as the judging unit judges that a bandwidth being equal to or larger than the bandwidth of the bit rate calculated in accordance with the predetermined data size and the predetermined time interval is available for the communication between the first apparatus and the second apparatus if the evaluation value calculated by the at least one processor acting as the calculating unit is smaller than the threshold, and the judging unit judges that the bandwidth being equal to or larger than the bandwidth of the bit rate calculated in accordance with the predetermined data size and the predetermined time interval is unavailable for the communication between the first apparatus and the second apparatus if the evaluation value calculated by the at least one processor acting as the calculating unit is equal to or larger than the threshold.

3. The information processing system according to claim 2,
wherein the processor of the first apparatus is further configured to act as a changing unit for changing at least one of the predetermined data size and the predetermined time interval to change the bit rate of the UDP packets to be transmitted to the second apparatus,
the at least one processor acting as the judging unit judges availability or unavailability for each bit rate changed by the changing unit,
the processor of the first apparatus is further configured to act as a setting unit for setting a quality of data for communication between the first apparatus and the second apparatus based on a bandwidth included between a bit rate judged as being available by the judging unit and a bit rate judged as being unavailable, and
wherein the first apparatus starts data communication based on the quality of the data set by the setting unit.

4. The information processing system according to claim 3,
wherein, based on UDP packets transmitted at a first bit rate, if the at least one processor acting as the judging unit judges that the first bit rate is available, the at least one processor acting as the transmitting unit transmits UDP packets to the second apparatus at a second bit rate that is larger than the first bit rate.

5. The information processing system according to claim 3,
wherein, based on UDP packets transmitted at a third bit rate, if the at least one processor acting as the judging unit judges that the third bit rate is unavailable, the at least one processor acting as the transmitting unit transmits UDP packets to the second apparatus at a fourth bit rate that is smaller than the third bit rate.

6. The information processing system according to claim 1,
wherein the at least one processor acting as the calculating unit calculates the evaluation value for the evaluation of the delay state of the communication path between the first apparatus and the second apparatus based on a first evaluation value based on an average difference between the reception time interval of the packets in each of the pairs of the UDP packets extracted by the extracting unit and the predetermined time interval, and a second evaluation value based on a ratio of a pair of the UDP packets having a reception time interval that is longer than a transmission time interval of the packets from among the pairs of the UDP packets extracted by the extracting unit.

7. An information processing apparatus comprising:
at least one processor acting as:
a receiving unit that receives at least a part of a plurality of UDP packets each having a predetermined data size and sequentially transmitted at a predetermined time interval in a predetermined order;
an extracting unit that extracts pairs of the UDP packets, in which each of a transmission order and a reception order is continuous and the transmission order and the reception order match with each other, from among the UDP packets received by the receiving unit;
a calculating unit that calculates an evaluation value for evaluation of a delay state of a communication path between the first apparatus and the second apparatus based on comparison between a reception time interval of the packets in each of the pairs of the UDP packets extracted by the extracting unit and the predetermined time interval; and
a judging unit that judges whether a bandwidth of a bit rate, which is calculated in accordance with the predetermined data size and the predetermined time interval based on comparison between the evaluation value calculated by the calculating unit and a threshold, is available or unavailable for communication between the first apparatus and the second apparatus.

8. A non-transitory computer readable medium storing a program that causes a computer to function as:
a receiving unit that receives at least a part of a plurality of UDP packets each having a predetermined data size and sequentially transmitted at a predetermined time interval in a predetermined order;
an extracting unit that extracts pairs of the UDP packets, in which each of a transmission order and a reception order is continuous and the transmission order and the reception order match with each other, from among the UDP packets received by the receiving unit;
a calculating unit that calculates an evaluation value for evaluation of a delay state of a communication path between the first apparatus and the second apparatus based on comparison between a reception time interval of the packets in each of the pairs of the UDP packets extracted by the extracting unit and the predetermined time interval; and
a judging unit that judges whether a bandwidth of a bit rate, which is calculated in accordance with the predetermined data size and the predetermined time interval, is available or unavailable for communication between the first apparatus and the second apparatus based on comparison between the evaluation value calculated by the calculating unit and a threshold.

* * * * *